United States Patent
D'Amico et al.

(10) Patent No.: US 7,414,572 B2
(45) Date of Patent: Aug. 19, 2008

(54) METHOD AND APPARATUS FOR SIGNAL DETECTION

(75) Inventors: Thomas D'Amico, Inverness, IL (US); Peijuan Liu, Palatine, IL (US); Roger Peterson, Inverness, IL (US)

(73) Assignee: Motorola, Inc., Schaumburg, IL (US)

( * ) Notice: Subject to any disclaimer, the term of this patent is extended or adjusted under 35 U.S.C. 154(b) by 346 days.

(21) Appl. No.: 11/276,495

(22) Filed: Mar. 2, 2006

(65) Prior Publication Data

US 2007/0216570 A1    Sep. 20, 2007

(51) Int. Cl.
*G01S 13/00* (2006.01)
*H04B 1/00* (2006.01)

(52) U.S. Cl. .................. 342/159; 342/52; 455/63.1

(58) Field of Classification Search .......... 342/52, 342/159, 195; 375/316, 346–348; 455/63.1, 455/67.13, 296
See application file for complete search history.

(56) References Cited

U.S. PATENT DOCUMENTS

| | | | |
|---|---|---|---|
| 6,404,760 B1 * | 6/2002 | Holtzman et al. ........... 370/342 |
| 6,697,013 B2 | 2/2004 | McFarland et al. |
| 6,891,496 B2 | 5/2005 | Husted et al. |
| 7,079,609 B2 * | 7/2006 | D'Amico et al. ............ 375/346 |
| 2004/0203826 A1 | 10/2004 | Sugar et al. |
| 2005/0059363 A1 | 3/2005 | Hansen |
| 2005/0074079 A1 * | 4/2005 | Jin ............................ 375/346 |
| 2005/0152485 A1 * | 7/2005 | Pukkila et al. .............. 375/348 |
| 2007/0183483 A1 * | 8/2007 | Narayan et al. ............. 375/148 |
| 2007/0291866 A1 * | 12/2007 | Rajappan et al. ............ 375/267 |

FOREIGN PATENT DOCUMENTS

| | | |
|---|---|---|
| EP | 1505772 | 2/2005 |
| EP | 1515488 | 3/2005 |

* cited by examiner

*Primary Examiner*—Isam Alsomiri

(57) ABSTRACT

A method and apparatus for signal detection is provided herein. During operation logic circuitry will determine if a de-sensing signal exists within any received signal and, if a de-sensing signal exists, then it will be assumed that a radar pattern exists where the de-sensing signal exists within the signal. Any received signal pattern is then correlated to known radar transmission pattern in order to determine whether or not a radar transmission pattern was received. If a known transmission pattern was received then logic circuitry will prevent further transmission.

20 Claims, 2 Drawing Sheets

100

METHOD AND APPARATUS FOR SIGNAL DETECTION

FIELD OF THE INVENTION

The present invention relates generally to signal detection, and in particular, to a method and apparatus for signal detection within a communication system.

BACKGROUND OF THE INVENTION

According to the US Electronic Code of Federal Regulations—Title 47—Part 15—Section 15.407 (h) (2), devices operating in the 5.25-5.35 GHz and 5.47-5.725 GHz bands shall employ a radar detection mechanism to detect the presence of radar systems and to avoid co-channel operation with radar systems. In particular, conformance requires that unlicensed equipment operating in the 5.25-5.35 GHz and 5.47-5.725 GHz bands be able to detect Bin 5 radar signals with a minimum successful detection probability of 80% (out of 30 trials) at the end of the 12-second long test signal of each trial. After detecting the Bin 5 radar signal, the equipment must vacate the frequency within 10 seconds and refrain from transmitting in the same frequency band for the next 30 minutes. As is evident, any false alarm will cause the equipment to be unnecessarily blocked out of the frequency for an extended period of time resulting in a possible disruption in service. A desirable detection method must therefore have high probability of detection while minimizing the false detection probability. The detection method must additionally function when other signals (i.e., de-sensing signals) are present. Therefore, a need exists for a method and apparatus for signal detection that can reliably detect the presence of a signal and has a low occurrence of false detections.

DETAILED DESCRIPTION OF THE DRAWINGS

To address the above-mentioned need, a method and apparatus for signal detection is provided herein. During operation logic circuitry will determine if a de-sensing signal exists within any received signal and, if a de-sensing signal exists, it will be assumed that a portion of a radar pattern exists where the de-sensing signal exists within the signal. Any received signal pattern is then correlated to possible radar transmission patterns (which are known beforehand) to determine if a radar transmission pattern was received. If a known transmission pattern was received then logic circuitry will prevent further transmission.

The present invention encompasses a method for detecting known signal patterns. The method comprises the steps of receiving a signal, determining if a de-sensing signal exists within the signal, and if the de-sensing signal exists, then assuming that a portion of a known signal pattern exists where the de-sensing signal exists within the signal. A transmission pattern is identified existing within the received signal and the transmission pattern in the received signal is correlated to the known signal patterns. A determination is made whether or not the known signal pattern was received, and if the known signal pattern was received then communication is prevented.

The present invention additionally encompasses a method for detecting known radar patterns. The method comprises the steps of receiving a potential radar signal, determining if a de-sensing signal exists within the potential radar signal, and if the de-sensing signal exists within the potential radar signal, then inserting a portion of the known radar pattern where the de-sensing signal exists within the potential radar signal to produce a signal pattern. A determination is then made if the signal pattern correlates with the known radar pattern, and if the signal pattern correlates, transmission is prevented.

The present invention additionally encompasses an apparatus comprising a receiver receiving a potential radar signal and a de-sensing signal and a transmitter. Logic circuitry is provided for determining whether a de-sensing signal exists within the potential radar signal and, if the de-sensing signal exists within the potential radar signal, then inserting a portion of a known radar pattern where the de-sensing signal exists within the potential radar signal to produce a signal pattern, the logic circuitry additionally determines if the signal pattern correlates with the known radar pattern; and prevents transmission from the transmitter.

Figure 1:
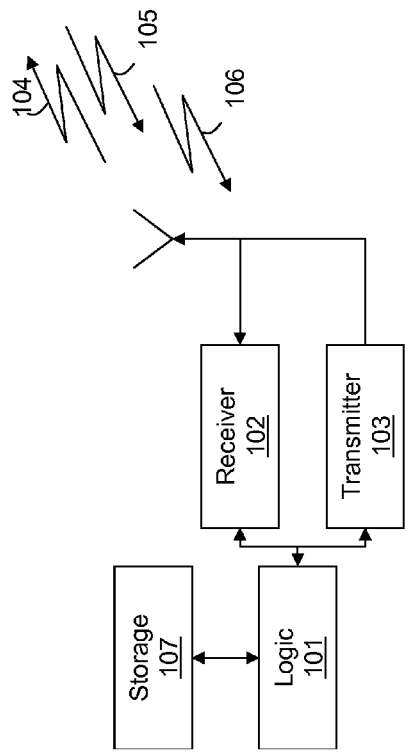
FIG. 1 is a block diagram of an apparatus for detecting the presence of a signal.

Turning now to the drawings wherein like numerals designate like components, FIG. 1 is a block diagram of apparatus 100 for detecting the presence of a signal and preventing transmissions when the presence is detected. As shown, apparatus 100 comprises logic circuitry 101, receiver 102, transmitter 103, and storage 107. In the preferred embodiment of the present invention apparatus 100 comprises a standard transceiver operating utilizing one of several available communication system protocols. For example, apparatus 100 may comprise a transceiver employing an IEEE 802.16 standard communication system protocol, a protocol for short range communication such as the IEEE 802.11 communication system protocol, or any other communication system protocol utilizing over-the-air transmissions.

During operation receiver 102 receives communication signals (such as signals 105 and 106) and transmitter 103 transmits signal 104. As discussed above, devices such as apparatus 100 operating in the 5.25-5.35 GHz and 5.47-5.725 GHz bands shall employ a radar detection mechanism to detect the presence of radar systems and cease transmission when the radar signal is detected. Thus, for example, if apparatus 100 was actively transmitting signal 104, and was actively receiving non-radar communication signal 105, apparatus 100 would have to cease transmissions of signal 104 if a radar signal (e.g., signal 106) was received.

Because apparatus 100 would have to cease transmissions for 30 minutes, it is critical that an accurate signal detection mechanism be employed. In order to address this issue, logic circuitry 101 will analyze any received signal for the presence of known transmission pattern (for example, a Bin 5 transmission pattern) of radar signal 106. However, because any other received signal (e.g., signal 105) may interfere with (de-sense) the reception of signal 106, logic circuitry 101 will need to take adequate measures ensure that transmission is ceased, even when a de-sensing signal is present. This is accomplished by logic circuitry 101 determining if a de-sensing signal exists during the reception of any potential radar signal. If a de-sensing signal exists, then logic circuitry will assume that the radar pattern exists where the de-sensing signal exists within the potential radar signal. Any received signal pattern is then correlated to possible radar transmission patterns (which are known beforehand) to determine if a radar transmission pattern was received. If a known radar transmission pattern is determined to have been received then logic circuitry 101 will prevent transmitter 103 from communicating.

The existence of a de-sensing signal is based on the receive power level of the interfering signal. If the receive power level of the interfering signal is above a threshold (e.g., a receive power level sufficient to prevent reception of radar pulses at the minimum required detection sensitivity), then a de-sensing signal exists and the logic circuitry will assume that the radar pattern exists during the time period of the de-sensing signal. Alternatively, if the receive power level of the interfering signal is below the threshold, then a de-sensing signal does not exist and the logic circuitry will not assume that a radar pattern exists during that time period.

It should be noted that logic circuitry 101 will determine that the known sequence (radar signal 106) was received when the correlation between the received signal and the known pattern is absolute (e.g., 100%). This means that all required elements of a known radar pattern must be either received or possibly present, but obscured by a de-sensing signal. For example, a summary of characteristics for a Bin 5 radar test signal is as follows:

1. The transmission period for the Bin 5 Radar test signal is 12 seconds.
2. There are a total of 8 to 20 bursts in the 12 second period, with the number of burst being randomly chosen. This number is Burst_Count.
3. Each burst consists of 1 to 3 pulses, with the number of pulses being randomly chosen. Each burst within the 12 second sequence may have a different number of pulses.
4. The pulse width is between 50 and 100 microseconds, with the pulse width being randomly chosen. Each pulse within a burst will have the same pulse width. Pulses in different bursts may have different pulse widths.
5. Each pulse has a linear FM chirp between 5 and 20 MHz, with the chirp width being randomly chosen. Each pulse within a burst will have the same chirp width. Pulses in different bursts may have different chirp widths. The chirp is centered on the pulse.
6. If more than one pulse is present in a burst, the time between the pulses will be between 1000 and 2000 microseconds, with the time being randomly chosen. If three pulses are present in a burst, the time between the first and second pulses is chosen independently of the time between the second and third pulses.
7. The 12 second transmission period is divided into even intervals. The number of intervals is equal to Burst_Count. Each interval is of length (12,000,000/Burst_Count) microseconds. Each interval contains one burst. The start time for each burst is chosen independently.

In the preferred embodiment of the present invention, the received signal pattern (i.e., potential radar signal) is stored in storage 107 (e.g., solid state memory), with logic unit 101 inserting the portions of the known signal pattern during periods of de-sensing. The stored signal can then be analyzed for characteristics such as pulse width, number of pulses within particular time periods, inter-pulse spacing, received signal amplitude, or modulation characteristics of any received pulse. A determination is made whether a number of the characteristics in the received signal correlate to known transmission patterns.

Note that the step of inserting a known pattern during de-sensing periods can be accomplished most efficiently by identifying which required elements of the known pattern are missing and then determining if it is possible for those required elements to exist within the de-sensing period(s).

Figure 2:
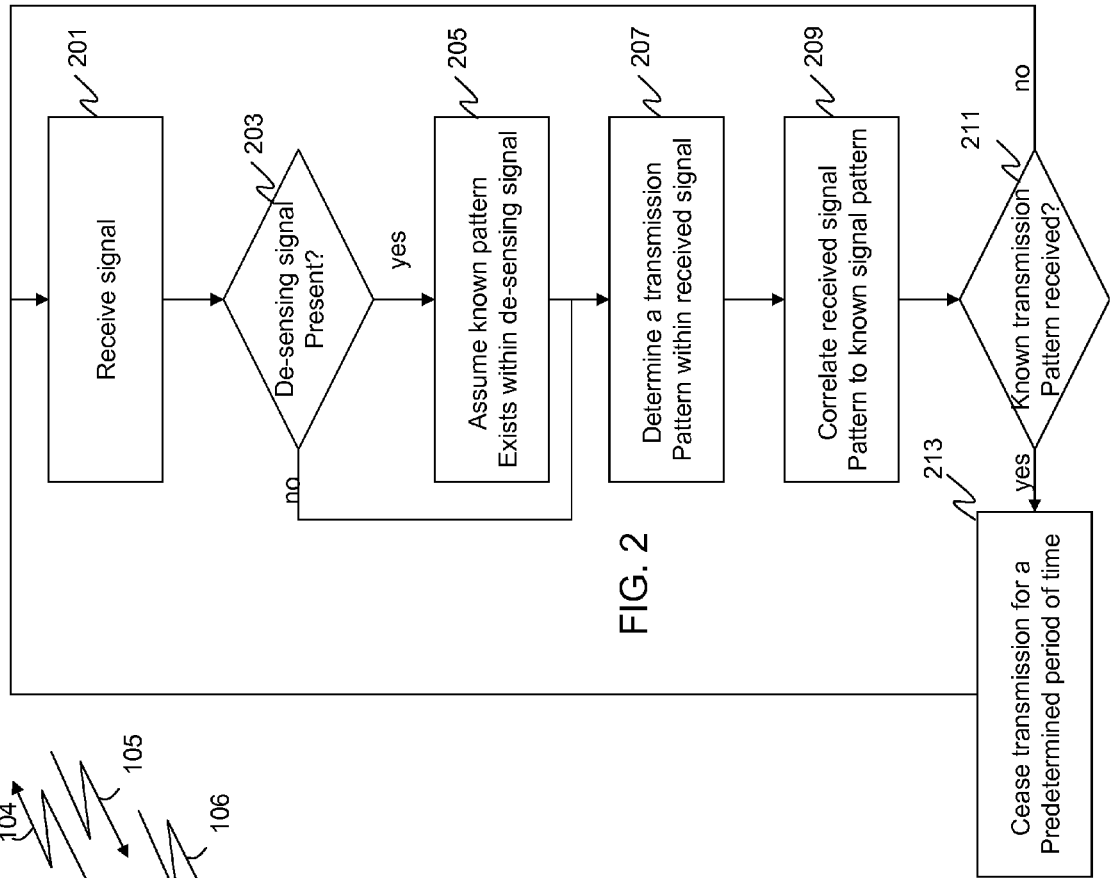
FIG. 2 is a flow chart showing the operation of the apparatus of FIG. 1

FIG. 2 is a flow chart showing operation of apparatus 100. The following logic flow shows the steps taken by apparatus 100 to determine if a known signal pattern (e.g., a known radar signal) exists within a received signal. The logic flow begins at step 201 where a signal (e.g., a potential radar signal) is received by receiver 102. At step 203 it is determined if a de-sensing signal is present within the received signal, and if not the logic flow continues to step 207, otherwise the logic flow continues to step 205. As discussed, a de-sensing signal is presumed to exist only when the receive power level of the de-sensing signal is above a threshold (e.g., a receive power level sufficient to prevent reception of radar pulses). Thus, the reception of a de-sensing signal below a threshold will be ignored.

At step 205 logic circuitry 101 assumes that a portion of a known signal pattern (a known radar pattern, for example, a Bin 5 radar pattern) exists where the de-sensing signal exists within the received signal. Logic circuitry inserts a portion of the known signal pattern where the de-sensing signal exists within the signal. Additionally, during the de-sensing period (s), logic circuitry 101 will identify which required elements of the known pattern are missing from the received potential radar signal and then determine if it is possible for those required elements to exist within the de-sensing period(s). If it is possible for the missing elements of a radar pattern to exist within the de-sensing period(s), then it is assumed that they exist during the de-sensing period (e.g., they are inserted in the de-sensed period(s)).

At step 207 logic circuitry 100 identifies a transmission pattern existing within the received signal and correlates the transmission pattern (including the assumed known signal pattern existing where the de-sensing signal exists) with known signal patterns (step 209). As discussed, the step of correlating the transmission pattern to known signal patterns comprises the step of determining if a number of the characteristics for the transmission pattern match the characteristics of a known signal pattern. Such characteristics may include pulse width, number of pulses within particular time periods, inter-pulse spacing, received signal amplitude, and modulation characteristics of any received pulse.

At step 211a determination is made by logic circuitry of whether or not a known transmission pattern was received, and if so, the logic flow continues to step 213, otherwise the logic flow returns to step 201. At step 213 logic circuitry 101 prevents transmitter 103 from communicating for a predetermined period of time (e.g., 30 minutes).

Figure 3:
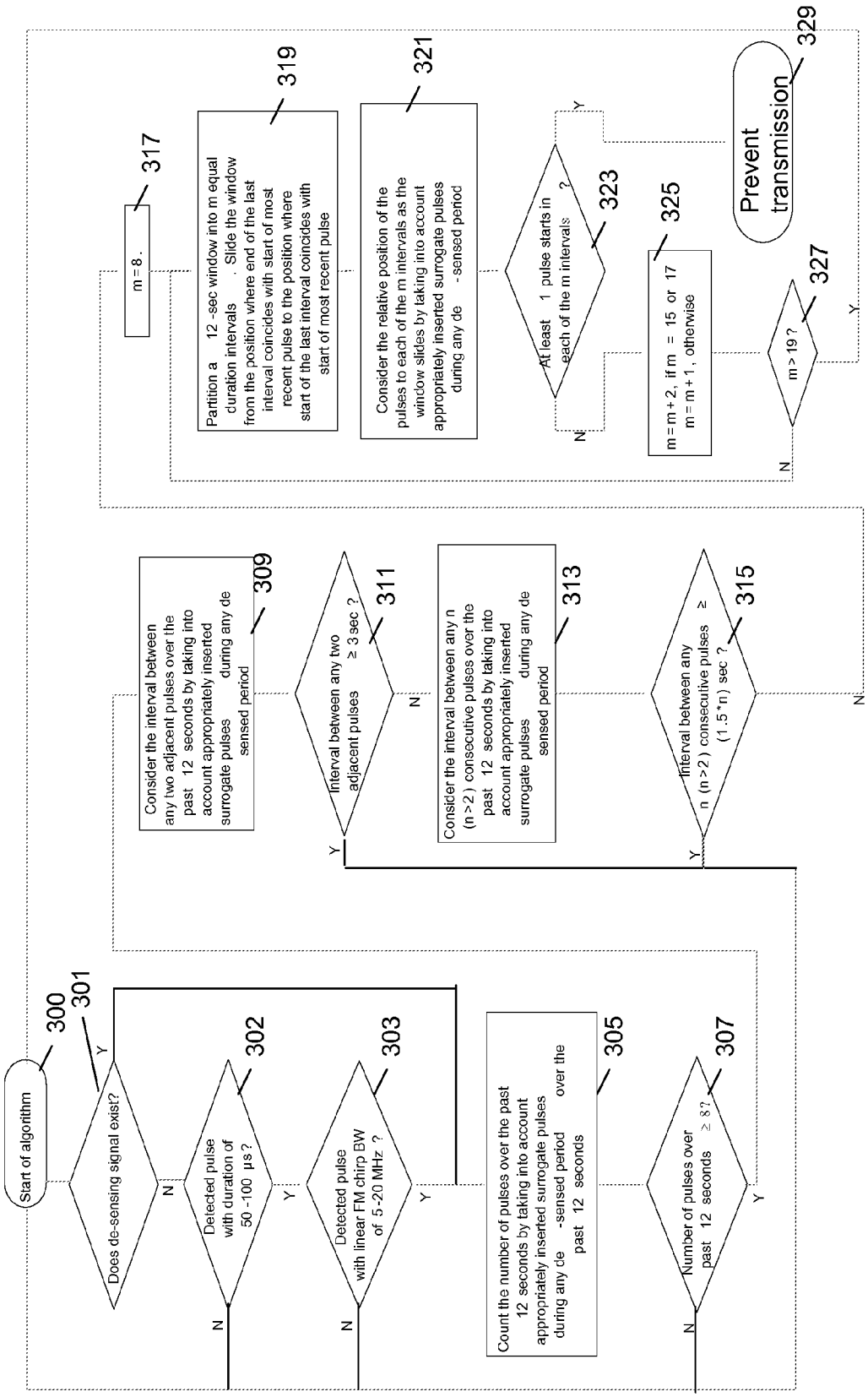
FIG. 3 is a flow chart showing steps to determine if a radar signal is present.

As discussed above, the determination that the known signal pattern was received is accomplished by correlating the received signal pattern (including the assumed radar pattern existing where the de-sensing signal exists) to known signal pattern. FIG. 3 shows how this is accomplished with respect to a Bin 5 radar signal. The logic flow begins at step 300. At step 301, logic circuitry 101 analyzes the received signal pattern within storage 107 to determine if a de-sensing signal exists. If at step 301a de-sensing signal is present, then the logic flow continues to step 305, otherwise the logic flow continues to step 302. At step 302, logic circuitry 101 analyzes the received signal pattern within storage 107 to detect the presence of a pulse of energy with duration of 50 to 100 µs. If at step 302 a pulse of energy with duration of 50 to 100 µs is detected, then the logic flow continues to step 303, otherwise the logic flow returns to step 300.

At step 303, logic circuitry 101 analyzes the pulse of energy and determines if the pulse is a linear FM chirp between 5 and 20 MHz, and if so the logic flow continues to step 305 where logic circuitry counts the number pulses over the last 12 second period taking into account appropriately inserted surrogate pulses inserted during any de-sensed period over the last 12 seconds. At step 307 it is determined if the number of stored pulses is less than 8. If so, then a Bin 5 radar test signal is not present and the logic flow returns to step 300. Otherwise the logic flow continues to step 309.

At step 309 logic circuitry 101 analyzes the stored signal to determine the interval between any two adjacent pulses over the past 12 seconds by taking into account appropriately inserted surrogate pulses during any de-sensed period. At step 311, logic circuitry 101 determines if any interval greater than or equal to 3 seconds is present, and if yes, the logic flow returns to step 300, otherwise the logic flow continues to step 313. At step 313 logic circuitry 101 analyzes the stored signal and determines the time interval between any n (n>2) consecutive pulses over the past 12 seconds by taking into account appropriately inserted surrogate pulses during any de-sensed period.

At step 315, logic circuitry 101 determines if any interval greater than or equal to 0.5 n seconds is present. If so, the logic flow returns to step 300, otherwise the logic flow continues to step 317 where a variable m is set to 8. At step 319 the 12 second window is defined and partitioned into m equal duration intervals. Logic circuitry 101 then slides the window from the position where the end of the last interval coincides with the start of the most recent pulse to the position where the start of the last interval coincides with the start of the most recent pulse.

At step 321, logic circuitry considers the relative position of the pulses within each of the m intervals as the window slides by, taking into account appropriately inserted surrogate pulses during any de-sensed period. At step 323 it is determined whether at least 1 pulse starts in each of the m intervals; and if not the logic flow continues to step 325, otherwise the logic flow continues to step 329 where transmission is prevented.

At step 325 m is set to m+2 if m=15 or 17, otherwise m is set to m+1. The logic flow continues to step 327 where it is determined if m>19, and if so the logic flow returns to step 300, otherwise the logic flow returns to step 319.

As previously discussed, insertion of surrogate pulses during de-sensing periods ensures detection of a radar test signal, but also increases the likelihood of false detection. When any detection (false or valid) occurs, the frequencies used for the radar transmission become unavailable for 30 minutes. This can have severe impact on system operation and should be avoided. The likelihood of false detection can be reduced by requiring additional minimum criteria for detection. For example, such minimum criteria could include the detection of at least a portion of the known radar signal during a time period when a de-sensing signal is not present, so that the insertion of surrogate pulses alone is insufficient for detection.

In an alternate embodiment of the present invention, all transmissions are temporarily suspended when radar-like pulses are present but before a radar signal is positively detected in order to reduce the frequency and duration of de-sensing signals. The suspension reduces the likelihood that additional surrogate pulses will cause a false detection by diminishing the future available opportunities (i.e. de-sensing periods) to insert surrogate pulses. Adaptable thresholds with hysteresis are utilized to initiate and terminate the suspension of transmissions. Transmissions are temporarily suspended only when a degree of match to the known signal exceeds an adaptive threshold.

The adaptable thresholds would be based on the degree of match to the algorithm tests, such as the number of additional future pulses needed before the presence of a radar signal could be confirmed. Very low thresholds will minimize future de-sensing signals and reduce false detection but may cause suspension of transmissions more often which would adversely impact system operation. Very high thresholds will cause the opposite result. Therefore, adaptable thresholds are desired that achieve a balance between false detection and frequency of suspending transmissions.

Initial thresholds are preset and then adapted automatically by the logic circuitry 101 based on its environment/history. For example, logic circuitry 101 decrements the thresholds whenever the presence of a radar signal is confirmed (or nearly confirmed) as a result of insertion of surrogate pulses after a radar-like pulse has been detected. In a similar manner, logic circuitry 101 increments the thresholds whenever transmissions are temporarily suspended and the presence of radar is not confirmed within 12 seconds.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method for detecting known signal patterns, the method comprising the steps of:
   receiving a signal;
   determining if a de-sensing signal exists within the signal;
   if the de-sensing signal exists, then assuming that a portion of a known signal pattern exists where the de-sensing signal exists within the signal;
   identifying a transmission pattern existing within the received signal;
   correlating the transmission pattern in the received signal to the known signal patterns;
   determining if the known signal pattern was received; and
   if the known signal pattern was received then preventing communication.

2. The method of claim 1 wherein the known signal pattern comprises a Bin 5 radar signal.

3. The method of claim 1 wherein the step of determining if a de-sensing signal exists comprises that step of determining if the de-sensing signal receive power level is above a threshold.

4. The method of claim 1 wherein the step of determining if the known signal pattern was received, comprises the step of requiring that at least a portion of the known signal pattern exists where the de-sensing signal does not exist.

5. The method of claim 1 wherein the step of correlating the transmission pattern to a known signal pattern comprises the step of analyzing the received signal for characteristics from a group consisting of pulse width, number of pulses within particular time periods, inter-pulse spacing, received signal amplitude, and modulation characteristics of any received pulse.

6. The method of claim 5 wherein the step of determining if the known signal pattern was received comprises the step of determining if a number of the characteristics match the known signal pattern.

7. The method of claim 1 wherein the step of correlating the transmission pattern to known signal patterns comprises the step of temporarily suspending transmissions while correlating.

8. The method of claim 7 wherein the step of temporarily suspending transmissions comprises the step of temporarily suspending transmissions only when a degree of match to the known signal exceeds an adaptive threshold.

9. The method of claim 8 further comprising the step of decrementing the adaptive threshold when the known signal pattern was received.

10. The method of claim 8 further comprising the step of incrementing the adaptive threshold whenever transmissions are temporarily suspended and the known signal pattern was not received.

11. A method for detecting known radar patterns, the method comprising the steps of:
receiving a potential radar signal;
determining if a de-sensing signal exists within the potential radar signal;
if the de-sensing signal exists within the potential radar signal, then inserting a portion of the known radar pattern where the de-sensing signal exists within the potential radar signal to produce a signal pattern;
determining if the signal pattern correlates with the known radar pattern; and
if the signal pattern correlates, preventing transmission.

12. The method of claim 11 wherein the step of determining if a de-sensing signal exists comprises that step of determining if the de-sensing signal exists only when a receive power level of a potential de-sensing signal is above a threshold.

13. The method of claim 12 wherein the threshold is a function of a minimum required detection sensitivity.

14. The method of claim 11 wherein the step of determining if the signal pattern correlates with the known radar pattern comprises the step of analyzing the signal pattern for characteristics from a group consisting of pulse width, number of pulses within particular time periods, inter-pulse spacing, received signal amplitude, and modulation characteristics of any received pulse.

15. The method of claim 14 wherein the step of determining if the signal pattern correlates with the known radar pattern comprises the step of determining if a number of the characteristics of the signal pattern match the known radar pattern.

16. The method of claim 11 further comprising the step of temporarily suspending transmissions while determining if the signal pattern correlates with a known radar pattern.

17. The method of claim 11 wherein the radar signal comprises a Bin 5 radar signal.

18. An apparatus comprising:
a receiver receiving a potential radar signal and a de-sensing signal;
a transmitter; and
logic circuitry to determine whether a de-sensing signal exists within the potential radar signal and, if the de-sensing signal exists within the potential radar signal, then inserting a portion of a known radar pattern where the de-sensing signal exists within the potential radar signal to produce a signal pattern, the logic circuitry additionally determines if the signal pattern correlates with the known radar pattern;
and prevents transmission from the transmitter.

19. The apparatus of claim 18 wherein the logic circuitry determines if the de-sensing signal exists only when a receive power level of a potential de-sensing signal is above a threshold.

20. The apparatus of claim 19 wherein the threshold is a function of a minimum required detection sensitivity.

* * * * *

UNITED STATES PATENT AND TRADEMARK OFFICE
CERTIFICATE OF CORRECTION

PATENT NO. : 7,414,572 B2 Page 1 of 1
APPLICATION NO. : 11/276495
DATED : August 19, 2008
INVENTOR(S) : Thomas V. D'Amico et al.

It is certified that error appears in the above-identified patent and that said Letters Patent is hereby corrected as shown below:

On the Title Page, item (75), under "Inventors", in Column 1, Line 1, after "Thomas" insert -- V. --.

On the Title Page, item (75), under "Inventors", in Column 1, Line 2, after "Roger" insert -- L. --.

In Column 3, Line 26, delete "burst" and insert -- bursts --, therefor.

In Column 4, Line 29, delete "100" and insert -- 101 --, therefor.

In Column 5, Line 19, delete "0.5" and insert -- 1.5 --, therefor.

Signed and Sealed this

Twenty-first Day of July, 2009

JOHN DOLL
*Acting Director of the United States Patent and Trademark Office*